United States Patent [19]

Pierce et al.

[11] Patent Number: 5,394,784
[45] Date of Patent: Mar. 7, 1995

[54] ELECTRONIC APPARATUS TO ASSIST TEACHING THE PLAYING OF A MUSICAL INSTRUMENT

[75] Inventors: F. Scott Pierce, Colorado Springs; Jim Clemens, Denver; Wenton L. Davis, Colorado Springs; Robert V. Dupont, Colorado Springs; Ronald H. Sartore, Colorado Springs; Lynn D. Stricklan, Colorado Springs, all of Colo.

[73] Assignee: Softronics, Inc., Colorado Springs, Colo.

[21] Appl. No.: 907,998

[22] Filed: Jul. 2, 1992

[51] Int. Cl.[6] .............................................. G10G 7/00
[52] U.S. Cl. .................................... 84/464 A; 84/478; 84/645
[58] Field of Search ................ 84/464 R, 464 A, 645, 84/477 R, 478

[56] References Cited

U.S. PATENT DOCUMENTS

| | | |
|---|---|---|
| 4,040,324 | 8/1977 | Green . |
| 4,466,324 | 8/1984 | Okamoto et al. . |
| 4,480,521 | 11/1984 | Schmoyer . |
| 4,651,612 | 3/1987 | Matsumoto . |
| 4,694,723 | 9/1987 | Shinohara et al. . |
| 4,703,681 | 11/1987 | Okamoto . |
| 4,768,412 | 9/1988 | Sanderson . |
| 5,040,447 | 8/1991 | Murata et al. . |
| 5,070,399 | 12/1991 | Martel .......................... 84/464 R |
| 5,214,231 | 5/1993 | Ernst et al. ..................... 84/652 |
| 5,247,864 | 9/1993 | Konishi ........................ 84/477 R |
| 5,257,317 | 10/1993 | Stavrou ........................ 84/711 |
| 5,266,735 | 11/1993 | Shaffer et al. ................. 84/609 |
| 5,275,082 | 1/1994 | Kestner-Clifton et al. ....... 84/477 B |

FOREIGN PATENT DOCUMENTS 2479-516  3/1980  France .

*Primary Examiner*—William M. Shoop, Jr.
*Assistant Examiner*—Jeffrey W. Donels
*Attorney, Agent, or Firm*—Duft, Graziano & Forest

[57] ABSTRACT

A display module which is independent from a keyboard and can be placed above the keys of any keyboard is provided. The display module includes indicating lights which are positioned to be above each key. A separate processor module receives MIDI signals on a MIDI input board. These signals can be sent along a MIDI cable connected to the processor module, and can originate from either a keyboard, a computer, or any other MIDI compatible device. The processor ignores all but certain of the MIDI signals, keeping the operation simple. In particular, the processor responds to note on and note off signals to turn on the indicating light for a corresponding key.

17 Claims, 6 Drawing Sheets

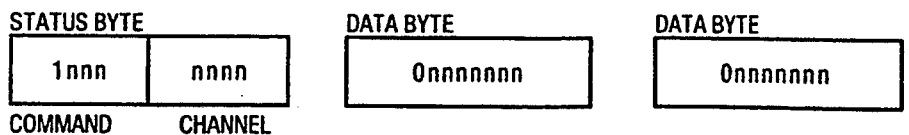

| STATUS BYTE BINARY DESCRIPTION | | DATA BYTE 1 VALUE | DESCRIPTION | DATA BYTE 2 VALUE | DESCRIPTION |
|---|---|---|---|---|---|
| 1000nnnn | NOTE OFF | 0-127 | NOTE NUMBER | 0-127 | OFF VELOCITY VALUE |
| 1001nnnn | NOTE ON | 0-127 | NOTE NUMBER | 0-127 | ON VELOCITY VALUE |
| 1010nnnn | POLYPHONIC AFTERTOUCH | 0-127 | NOTE NUMBER | 0-127 | PRESSURE VALUE |
| 1011nnnn | CONTROL CHANGE | 0-120 | CONTROLLER | 0-127 | CONTROL VALUE |
| | | 121-127 | (SEE CHANNEL MODE MESSAGES) | | |
| 1100nnnn | PROGRAM CHANGE | 0-127 | PROGRAM NUMBER | | |
| 1101nnnn | CHANNEL AFTERTOUCH | 0-127 | PRESSURE VALUE | | |
| 1110nnnn | PITCH BLEND | 0-127 | BLEND VALUE LSB | 0-127 | BLEND VALUE MSB |

CHANNEL MODE CONTROLLER MESSAGES

| DATA BYTE 1 CONTROLLER | DESCRIPTION | DATA BYTE 2 VALUE | DESCRIPTION |
|---|---|---|---|
| 121 | RESET ALL CONTROLLERS | 0 | |
| 122 | LOCAL CONTROL | 0 | LOCAL OFF |
| 127 | | | LOCAL ON |
| 123 | ALL NOTES OFF[1] | 0 | |
| 124 | OMNI MODE OFF[2] | 0 | |
| 125 | OMNI MODE ON[3] | 0 | |
| 126 | MONO MODE ON[4] | 0 | THE NUMBER OF CHANNELS IS THE NUMBER OF VOICES IN THE RECEIVNG DEVICE |
| | | 1-16 | THE NUMBER OF CHANNELS AS SET BY THE USER |
| 127 | POLY MODE ON | 0 | |

NOTES:
1. SETS ALL NOTES OFF
2. SETS ALL NOTES OFF
3. SETS ALL NOTES AND POLY MODE OFF
4. SETS ALL NOTES AND MONO MODE OFF

*FIG. 4*

ELECTRONIC APPARATUS TO ASSIST TEACHING THE PLAYING OF A MUSICAL INSTRUMENT

Attached hereto as Appendix I is a source code listing in assembly language of the program stored in the processor memory of the present invention.

BACKGROUND OF THE INVENTION

The present invention relates to devices which aid in the teaching of playing a keyboard by turning on and off lights above each key to indicate keys to be played.

A number of designs have been developed using indicating lights, such as LEDs to indicate the keys on a keyboard to be played. French published Application No. 2,479,516 shows a pad containing light emitting diodes which is positioned above the piano keys with a diode positioned above each key. A red diode is provided for white keys and a green diode for black keys. The application generally describes a microprocessor being coupled to a cassette player to somehow interpret the sounds and illuminate the appropriate key. The details of how this is done do not appear to be disclosed. The volume is used to control the light intensity.

U.S. Pat. No. 4,703,681 shows a keyboard with indicator lights above each key. A special timing circuit is disclosed which lights up the LED corresponding to the key prior to the time it is to be played, thus giving the user advance notice of the transition.

U.S. Pat. No. 4,694,723 shows a keyboard with embedded LEDs above the keys. A ROM pack with stored music is used to provide signals to the LEDs to light them up in accordance with the music to be played. Keyboard depressions are then detected, and compared with the desired timing of the key. An indication is provided to the user of whether the keys are being played properly by comparing the signals sent to the LED and the key depression signals.

U.S. Pat. No. 4,651,612 shows a keyboard with indicating lights above the keys. An auto play data ROM is used to produce signals to the LEDs to light them up and also to generate accompanying musical sounds to go with the keyboard. The key depression signals are compared to the desired depressions as indicated by the LEDs. The accompanying music is either sped up or slowed down to match the speed at which the keyboard is actually being played.

Keyboard synthesizers in other instruments which produce music have been developed. In addition, devices which input digital representations of music to a computer have also been developed. A standard has been developed for the digital communication of such musical information, called the Musical Instrument Digital Interface (MIDI) a copy of which is available from the International MIDI Association, 5316 West 57th Street, Los Angeles, Calif. 90056. Basically, the MIDI standard provides that communication is done serially and asynchronously at a rate of 31.25 kilobaud. Information is transmitted by first transmitting a status byte, followed by two nibbles. The high nibble (first four bits) indicates the type of command. The low nibble indicates one of sixteen channels. A common use for the channels is to assign them to different instruments (piano, violin, drums) reproduced by a synthesizer. Data bytes follow the status byte and are interpreted differently depending upon a particular status byte. For instance, one status byte will indicate that a note should go on, and will be followed by a data byte indicating a digital value of the note and a second data byte indicating the velocity at which a key is depressed to produce that note.

It is desirable to have a simple teaching aid for a keyboard which is compatible with the MIDI standard and does not require additional complicated timing or other circuitry and is useful with different types of keyboard synthesizers and normal pianos.

SUMMARY OF THE INVENTION

The present invention provides a display module which is independent from a keyboard and can be placed above the keys of any keyboard. The display module includes indicating lights which are, positioned to be above each key. A separate processor module receives MIDI signals on a MIDI input board. These signals can be sent along a MIDI cable connected to the processor module, and can originate from either a keyboard, a computer, or any other MIDI compatible device. The processor ignores all but certain of the MIDI signals, keeping the operation streamlined. In particular, the processor responds to note on and note off signals to turn on the indicating light for a corresponding key.

In one embodiment, up to four modules can be interconnected, with the interconnection between modules maintaining the key spacing distance. Each module covers 24 notes, approximately 2 octaves. Each display module includes decode logic for determining which LED should be illuminated in response to a coded signal provided from the processor module. The processor interrogates its output lines to determine how many display modules are connected, and adjusts the position of middle C accordingly. For a single module, middle C is positioned at the left since the typical learner will use a single hand with middle C at the left. When multiple modules are used, middle C is placed at the middle of the display modules. The location of middle C is determined using an offset stored in RAM memory on the processor module. This offset is applied to the MIDI note value received, the result of which is used to produce the coded signal indicating the LED to be illuminated.

The processor module also includes a series of DIP switches. The first four of these DIP switches are used to select which one of the MIDI channels the processor module will respond to. Another set of the DIP switches can be used to shift the position of middle C up or down by adding another shift value to that stored in RAM memory to be applied to the note values as they are received on the MIDI input port.

The present invention thus provides a light indicating display which can be used with any keyboard since it is not integral with the keyboard. In addition, the display can be adapted to different keyboard sizes by attaching separate display modules together. Each display module is identical, thus simplifying the construction and assembly for a particular keyboard.

The present invention works with MIDI digital data intended for actually reproducing the music. This data is used to activate the indicator lights by intercepting only certain types of commands relevant to the turning off and on of notes. Other commands are not used in the present embodiment. This enables the present invention to plug into any standard MIDI port without requiring any modification at all and without the instrument or computer generating the MIDI data even knowing that it is attached.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a diagram of certain standard MIDI commands.

DESCRIPTION OF SPECIFIC EMBODIMENTS

Figure 1:
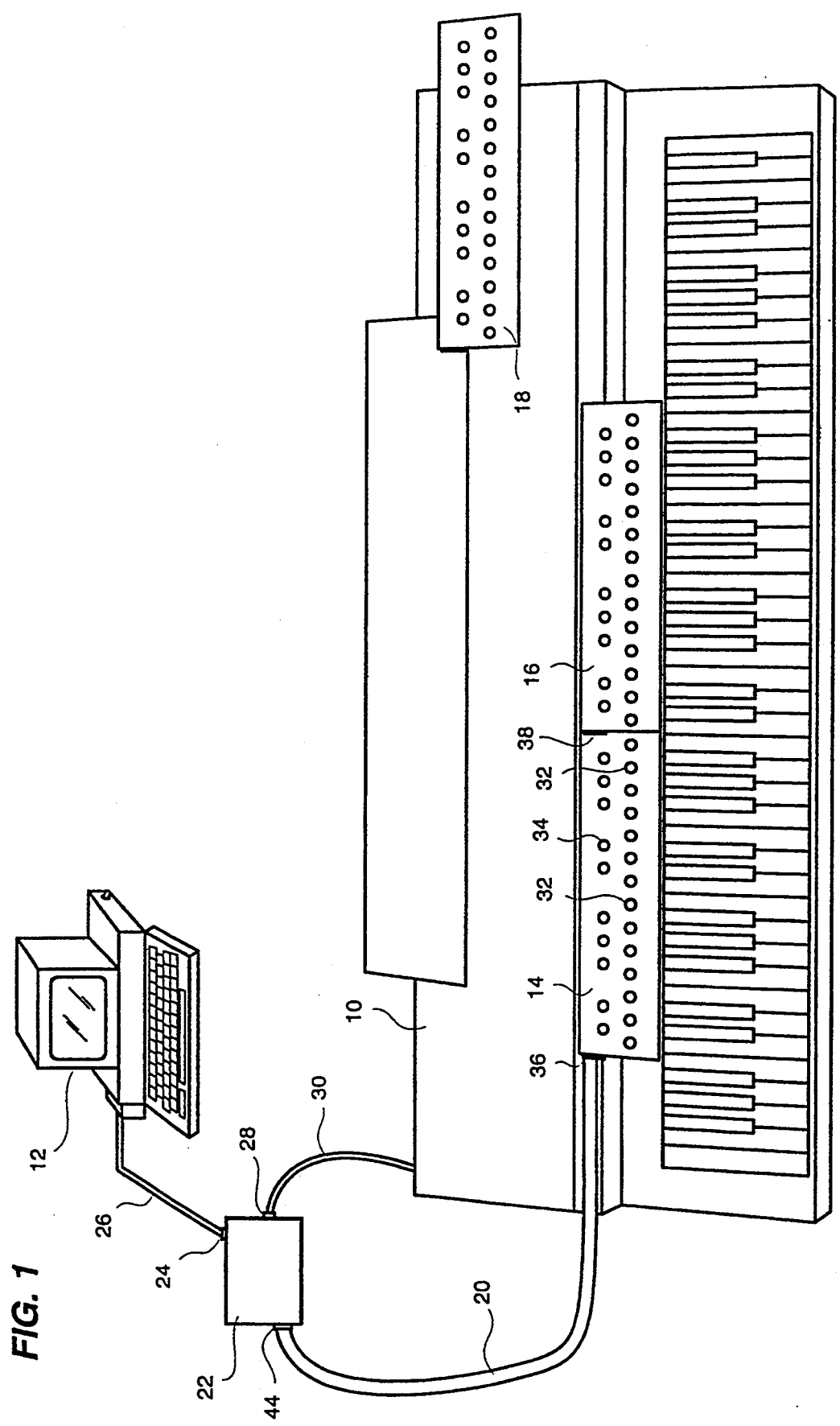
FIG. 1 is a perspective view showing the invention mounted on a keyboard.

FIG. 1 shows a standard keyboard synthesizer 10 and a personal computer 12. Alternately, an acoustic piano keyboard could be used. Three display modules according to the present invention are shown, display modules 14, 16 and 18. Display module 18 is shown to illustrate what a module looks like alone, before it is mounted above the keyboard. Modules 14 and 16 are connected together, and are also connected via a ribbon cable 20 to a processor module 22.

Processor module 22 includes a MIDI input port 24 connected by a MIDI cable 26 to computer 12. Another keyboard which generates MIDI signals could be used instead of the computer. Processor module 22 also includes a MIDI through port 28 which can be connected by another MIDI cable 30 to keyboard synthesizer 10.

Processor module 22 thus provides a path for a standard MIDI connection between computer 12 and synthesizer 10, which will operate in a standard manner without knowledge of the intervening processor module. The processor module will pick off appropriate signals to activate the LEDs on display modules 14 and 16 to indicate a particular key to be played.

Display module 14 includes a first row of LEDs 32 which correspond to the white keys of the keyboard. A second row of LEDs 34 correspond to the black keys. Display 14 includes an input port 36 for connection to ribbon cable 20, and an output port 38 for connecting to the next display module 16. Each display module is identical, and the connection between the modules maintains the spacing between the keys.

Figure 2A:
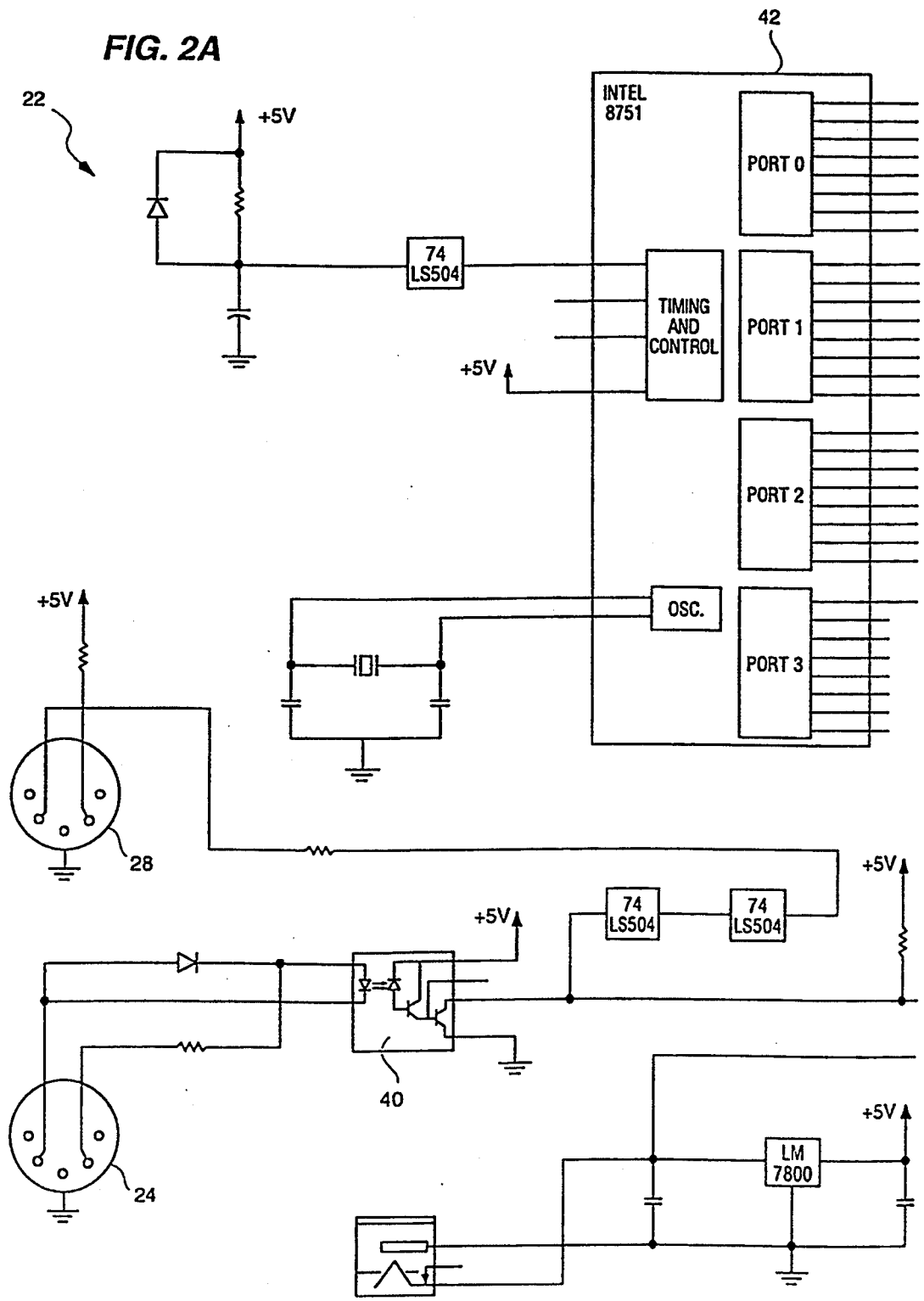
FIG. 2 is a circuit diagram of the processor module of FIG. 1.
Figure 2B:
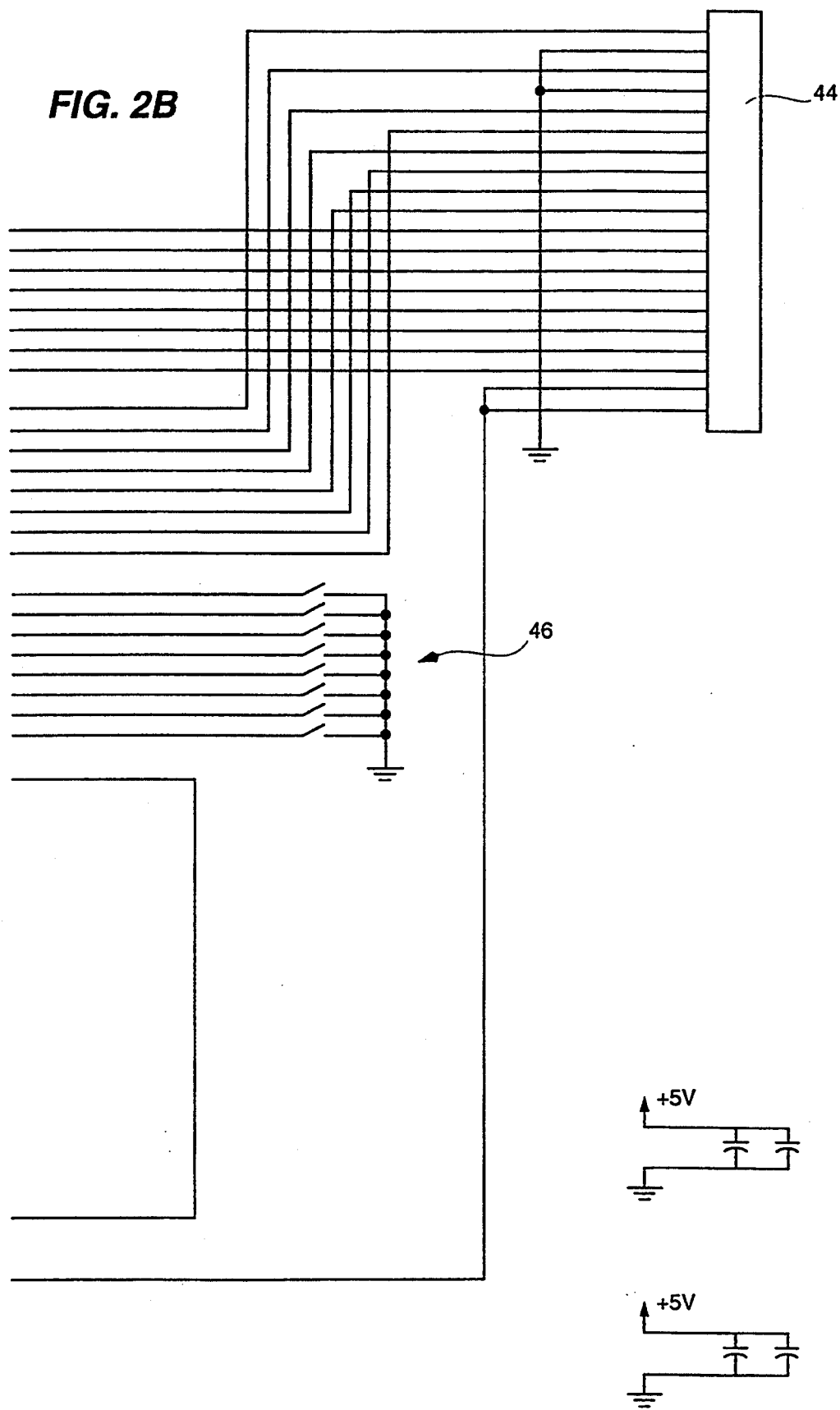

FIG. 2 is a schematic diagram of processor module 22 of FIG. 1. MIDI input port 24 is coupled through an optical isolator 40 to an input of a processor 42 and also to a MIDI through port 28. Processor 42 is preferably an Intel 8351/8751 microcomputer with the program set forth in Appendix I stored in it. Processor module 22 includes an output port 44 for coupling to ribbon cable 20. A number of DIP switches 46 are coupled to data inputs of the processor 42 to select one of 16 MIDI channels and provide an optional shift of the position of middle C as discussed below.

Figure 3A:
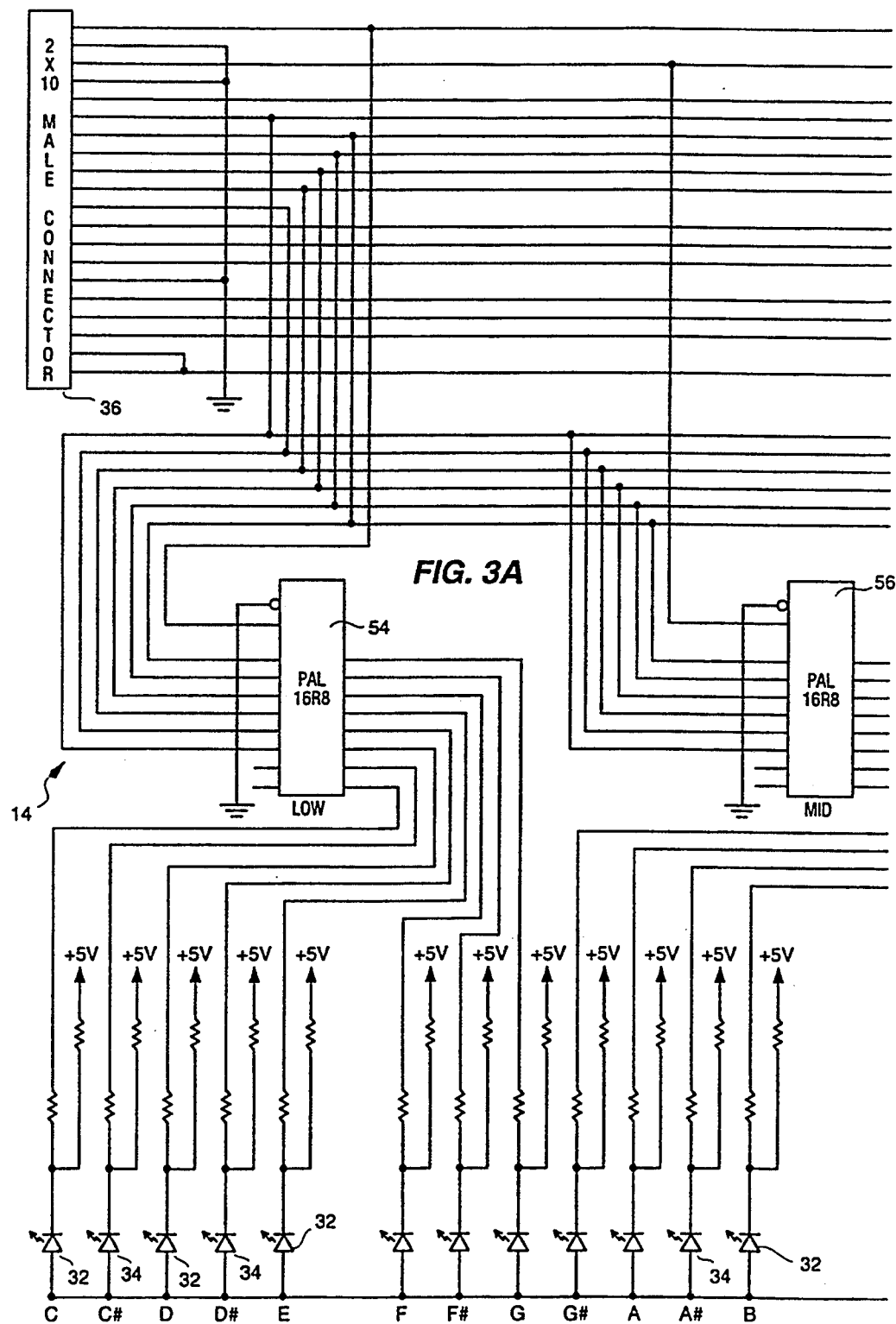
FIG. 3 is a circuit diagram of one of the display modules of FIG. 1.
Figure 3B:
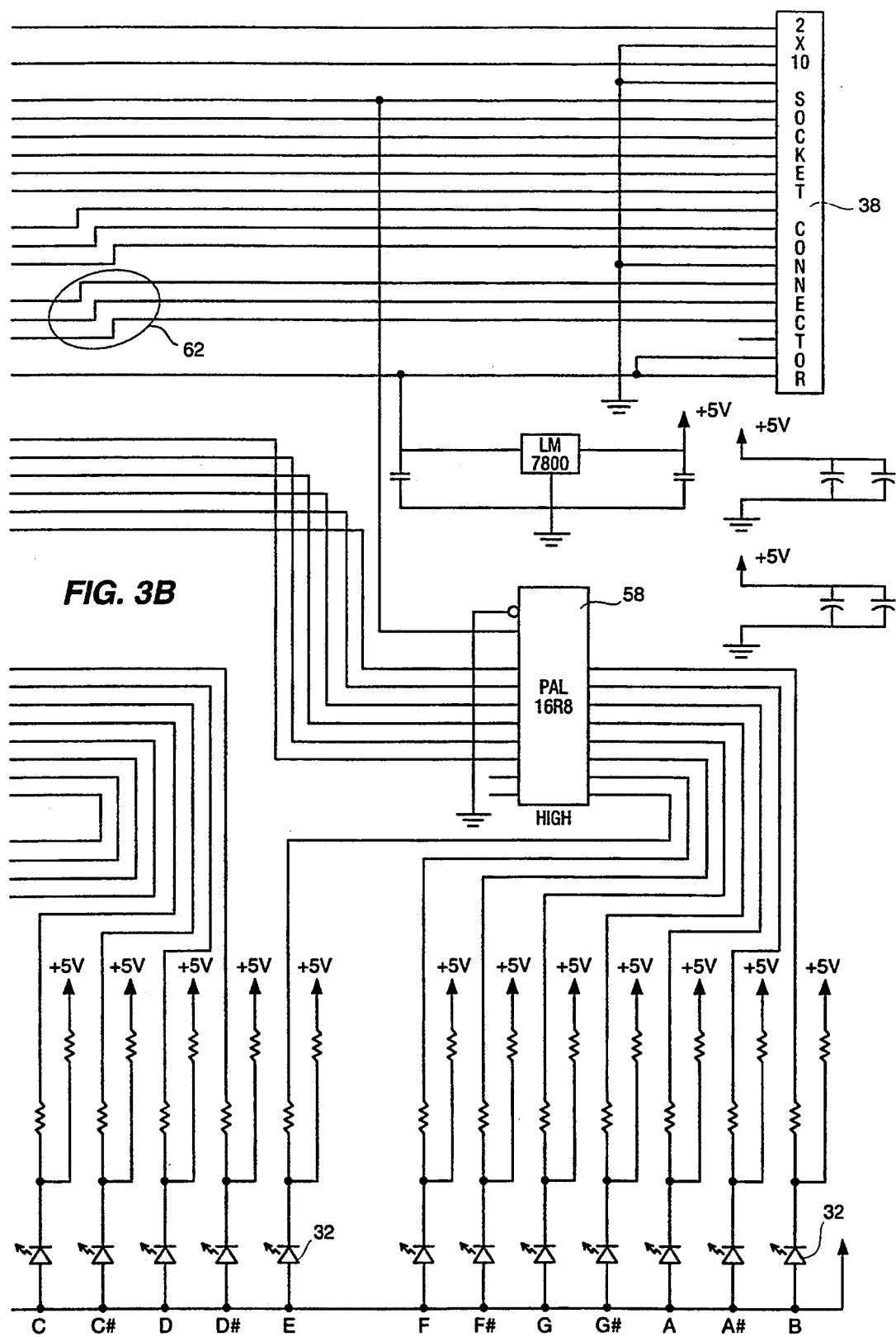

FIG. 3 is a schematic diagram of one of the display modules 14. Each display module has identical circuitry. The display module has an input port 36 and an output port 38. Three decoding logic circuits 54, 56 and 58 are coupled to the inputs. Outputs of these logic circuits are connected to individual LEDs 32, 34. As can be seen from the lettering below the EEDs, approximately two octaves of LEDs are provided, starting with C on the left and running through B on the right.

In operation, when power is first applied processor 42 will initialize the system. As part of the initialization, the processor will read the return lines RET0-RET3 coupled to its input from ribbon cable port 44 (FIG. 2). As can be seen in FIG. 3, the line RET0, pin 15, is grounded. The processor will read this and determine that a first display board is connected if a ground is detected. Otherwise, if no connection is detected, no display module is connected. The return lines are passed through to the output port 38 after being shifted as can be seen by the portion of lines in circle 62. Pin 15 at the output is connected to return line 1, pin 16 of the input port. Thus, if a second module is connected to output port 38, it will ground pin 15 as well, but this will be provided to pin 16 of the input connector 36 of the first module. In similar fashion, the third and fourth display modules can be connected and will provide their indicating signals on return lines RET2 and RET3, respectively.

A similar arrangement is used for the enable lines when the processor decides to send a signal to enable a particular display module. Enable lines EN1-EN4 are connected to pins 11-14 of input port 36. EN1 is connected to all three of decoder circuits 54, 56 and 58. EN2-EN4 are shifted and provided to the output port 38 on pins 11-13. Thus, EN2 will be provided to the EN1 line of the second board. Similarly, EN3 will be provided to the EN1 line of the third board, and EN4 to the EN1 line of the fourth board.

The particular decoder logic block to be selected on a particular display module board is determined by the clock signals, which are CLKLOW, CLKMID, and CLKHIGH, on pins 1, 3 and 5 respectively of port 50. CLKLOW is connected to the clock input of decoder circuit 54, CLKMID to decoder 56 and CLKHIGH to decoder 58.

Finally, the particular LED to be selected is determined by a three bit code SEL0-SEL2 which is provided from input port 36 to the decoder circuits 54, 56, 58. The three bit code is decoded by the decoder circuit to select one eight data outputs D0-D7 to turn on or off the LED connected to that data output.

FIG. 4 illustrates the MIDI protocol format along with some of the more common commands. The first two commands shown, the NOTE OFF and NOTE ON commands, are the main ones used by the present invention. Many manufacturers use the NOTE ON status byte and simply follow it with a string of data bytes, with the velocity value of zero indicating that the note should really be off if that is the case.

Controller messages are indicated by 1011, as shown in the table. The first data byte then contains the particular control or command. A subset of the controller messages are called Channel Mode messages. One used in initialization is controller 123, indicating all notes off. The processor of the present invention recognizes channel mode commands and ignores all other controller commands. The present invention also looks for certain system exclusive messages. These are non-standard messages a particular manufacturer may use. These start with a system-exclusive status byte (11110000), the manufacturer's ID code (0nnnnnnn) the data of the message, and end with an end of system-exclusive byte (11110111).

Appendix I attached hereto shows one embodiment of the source code for the processor of the present invention. On page 6, the data table "board-shift" stores a number of shift values which are subtracted from received note numbers to accomplish the middle C shift. For instance, for one board, the value of 60 is subtracted from the note number. For two boards, 36 is subtracted from the note number. On top of these shifts, an additional shift can be accomplished by the DIP switches described earlier.

The software for this embodiment of the invention is split into four modules/libraries. These modules are grouped in routines to keep similar routines tightly grouped together. DRIV8051.ASM is the main program and controls interface between all of the libraries. MIDI.LIB is the library of routines controlling the MIDI port. SERIAL.LIB is the library for the serial port, including the serial interrupt service routine. Finally, DISPLAY.LIB stores routines for the display interface including turning notes off and on. All of these routines work together to control the hardware from MIDI input to the final display output.

Several variables are used for control, storage, and buffers. The three buffers are internal stack, for the processor to store internal status and location information, a list of keys that are currently on, and a stream of characters form the serial (MIDI) port. Finally, a small group of independent variables are used to store information about serial string length, MIDI commands and channels, and size of the display.

When the MIDI-Lights instrument is first turned on, it executes a group of initialization instructions. It defines a starting register bank, initializes the serial port, checks for a display section to be connected, and enables the serial section of the processor.

Once all elements of the instrument are initialized, a command is sent to the display section to turn all LEDs off, since all notes are assumed to start off. Internal variables related to MIDI and errors are cleared. Next, the processor determines how many LEDs are available in the display, based on how many 24 notes indicator boards were found when the display section was initialized. The lowest and highest key to display is also computed.

The channel is initialized to zero, which corresponds to MIDI channel 1. The main loop is kept as small as possible to keep system response time to note on or off messages as fast as possible. The main loop begins by looking at the manual channel select switches. If a channel has been changed, the instrument selects the new channel and turns off all notes from the old channel. Next, the main loop looks for any character waiting in the serial buffer. If no character is found, the program jumps to the beginning of the loop and starts again. If a character is found in the buffer, the program enters the MIDI logic routines. When the program return from the MIDI routines, it jumps to the beginning of the loop and repeats the process again.

Each library has a specialized group of routines for its function. MIDI.LIB has a large group of routines to support the MIDI logic. LITSTRIP.LIB and SERIAL.LIB also have display and serial support routines, respectively.

MIDI.LIB—Despite the appearance of many routines in the MIDI library, they are all an integral part of a large singular routine. This routine is a "state-processor." As characters are received in strings, they are examined one at a time. When the program enters this "state-processor", the processor has a specific list of valid characters which are valid. If a character is invalid, the message is invalid, and is ignored. Some characters may interrupt the MIDI messages, such as timing or reset commands. These characters must be filtered out before they enter the state-processor, because they will cause the state-processor to incorrectly abort a message.

Once a character is determined to be a valid character for a specific state, the program moves to the next state, and returns to the main loop. However, some states, when they receive a valid character will turn notes off or on and then reset the state-processor to the beginning state to wait for a new message to begin.

LITSTRIP.LIB—The three routines in this library all support the display section of the instrument. Key Off is used to turn an LED off when a note off message has been received. The Key On routine similarly turns a note on. Finally, the Test Display routine is used to initialize the display section. The routine counts how many 24 notes indicator boards are connected to the display, and returns the number to the main program's initialization section.

SERIAL.LIB—This library is the smallest of the three, but it is the heart of the hardware interface to MIDI. The three routines are almost totally independent of each other, and are highly optimized for the instrument.

The Set Serial routine initializes the baud rate and buffers for the serial stream of characters from MIDI.

Getsch is a routine to get a serial character from the buffer. If the routine finds a character in the serial buffer, it collects it from the buffer, updating buffer control variables, and returns it to the program. If no character is found, a flag is set, and a null is returned to the program.

The Serial Interrupt Service routine is totally independent of the main program. It acts as a second program, that is started when a character is received from the MIDI port, executes and ends. When it begins, it saves all vital information and selects a new register bank. This is to keep from destroying information used by the main program and other libraries. It puts the character into the buffer, restores the stored information and ends.

As will be understood by the those familiar with the art, the present invention may be embodied in other specific forms without departing from the spirit or essential characteristics thereof. For example, the number of LEDs per board or the way in which the signals are routed between the connectors could be varied. A board could be used for the strings of a guitar or some other musical instrument. Also, the particular software routine could be varied or implemented in hardware. Accordingly, the disclosure of the preferred embodiment of the invention is intended to be illustrative, but not limiting, of the scope of the invention which is set forth in the following claims.

APPENDIX I

```
MIDI-Light programme:  DRIV8051.ASM    PAGE 1    Mon Mar 16 09:10:02 1992

;*******************************************************************************
;* 8051 DRIVER FOR "KEY LIGHT"                                                 *
;*******************************************************************************
```

```
0000              TITL  "MIDI-Light programme: DRIV8051.ASM"
                  ; By Wenton L. Davis at Softronics, Inc.
                  ; July, 1991 to February 10, 1992

;==========================================================================
                  ;                                                                          |
                  ;    This programme will be used to display note on and note off information|
                  ; as interpreted from a MIDI synthesizer.  A strip of  Light Emitting Diodes|
                  ; (L.E.D.s)  which lays across the top of the synthesizer is used to display|
                  ; this information, where one L.E.D. matches one specific musical key on the|
                  ; synthesizer.   When the system receives a  "key on" message,  it turns the|
                  ; corresponding L.E.D. on.   Likewise, when the system receives a  "key off"|
                  ; message, the corresponding L.E.D. is turned back off.                    |
                  ;                                                                          |
                  ;==========================================================================

0000              PAGE 60

0000                CPU    "C:\CROSS32\8051.TBL"   ;The processor used (8051/8351/8751)
0000                HOF    "INT8"                  ;Use INTeL format for Hex Output File 0000                      INCL    "MIDILITE.HDR"        ;Define assembly parameters, version...
                  ; MIDILIGHT.HDR HEADER FILE FOR MIDI LIGHTS OF DRIV8051.ASM

0000 =            FALSE:   EQU    00
FFFF =            TRUE:    EQU    -1

2416 =            SER2416: EQU    2416H              ;16MHz CRYSTAL, 2400 BAUD
2412 =            SER2412: EQU    2412H              ;12MHz CRYSTAL, 2400 BAUD
3112 =            SER3112: EQU    3112H              ;12MHz CRYSTAL, 31.25K BAUD

3112 =            SERIAL_DEVELOP: SETL SER3112
0000 =            SHELL_DEVELOP:  SETL 0

001F =            MIDI_ID:       SETL  1FH
0010 =            MAX_LEDS:      SETL  10H
0000              PAGE

;*******************************************************************************
                  ;MCS-51 INTERNAL REGISTERS                                                  |
                  ;-------------------------------------------------------------------------------
00F0 =            B:       EQU    0F0H              ;B REGISTER
00E0 =            ACC:     EQU    0E0H              ;ACCUMULATOR
00D0 =            PSW:     EQU    0D0H              ;PROGRAM STATUS WORD
00B8 =            IPC:     EQU    0B8H              ;INTERRUPT PRIORITY
00B0 =            P3:      EQU    0B0H              ;PORT 3
00A8 =            IEC:     EQU    0A8H              ;INTERRUPT ENABLE
00A0 =            P2:      EQU    0A0H              ;PORT 2
0099 =            SBUF:    EQU    99H               ;SEND BUFFER
0098 =            SCON:    EQU    98H               ;SERIAL CONTROL
0090 =            P1:      EQU    90H               ;PORT 1
008D =            TH1:     EQU    8DH               ;HIGH BYTE OF TIMER 1
0089 =            TMOD:    EQU    89H               ;TIMER MODE CONTROL BYTE
0088 =            TCON:    EQU    88H               ;TIMER CONTROL REGISTER
0087 =            PCON:    EQU    87H               ;POWER CONTROL REGISTER
0083 =            DPH:     EQU    83H               ;DATA POINTER HIGH
0082 =            DPL:     EQU    82H               ;DATA POINTER LOW
0081 =            SP:      EQU    81H               ;STACK POINTER
0080 =            P0:      EQU    80H               ;PORT 0

;-------------------------------------------------------------------------------
                  ;MCS-51 INTERNAL BIT ADDRESSES                                              |
                  ;-------------------------------------------------------------------------------
00D7 =            CY:      EQU    0D7H              ;CARRY FLAG
00D6 =            AC:      EQU    0D6H              ;AUXILIARY-CARRY FLAG
00D5 =            F0:      EQU    0D5H              ;USER FLAG 0
00D4 =            RS1:     EQU    0D4H              ;REGISTER SELECT MSB
00D3 =            RS0:     EQU    0D3H              ;REGISTER SELECT LSB
00D2 =            OV:      EQU    0D2H              ;OVERFLOW FLAG
00D0 =            P:       EQU    0D0H              ;PARITY FLAG
00BC =            PS:      EQU    0BCH              ;PRIORITY SERIAL PORT
00AF =            EA:      EQU    0AFH              ;ENABLE ALL INTERRUPT
00AC =            ES:      EQU    0ACH              ;ENABLE SERIAL INTERRUPT
009F =            SM0:     EQU    09FH              ;SERIAL MODE 0
009E =            SM1:     EQU    09EH              ;SERIAL MODE 1
009D =            SM2:     EQU    09DH              ;SERIAL MODE 2
009C =            REN:     EQU    09CH              ;SERIAL RECEPTION ENABLE
009A =            RB8:     EQU    09AH              ;RECEIVE BIT 8
0098 =            RI:      EQU    098H              ;RECEIVE INTERRUPT FLAG

;-------------------------------------------------------------------------------
                  ;Register Utilization Map                                                   |
                  ;-------------------------------------------------------------------------------
                  ;TEMP_STORAGE    R7              ;Temporary accumulator storage for On  |
                  ;SHIFT           R6              ;Shift value for note on/off messages  |
                  ;CHARACTER       R5              ;Serial/MIDI 8-bit character           |
                  ;MIDI_STATUS     R4              ;Value status for MIDI state processor |
```

```
                        ;                    R3
                        ;EXCLUSIVE_POINTR    R2              ;Pointer for MIDI exclusive message
                        ;GP1                 R1              ;General purpose index register
                        ;GP0                 R0              ;General purpose index register
0000                    PAGE ;----------------------------------------------------------------
                        ;Programme variables                                             |
                        ;----------------------------------------------------------------
0080 =                  PORT0:      EQU     080H            ;This port is used for enables and RET|
0090 =                  PORT1:      EQU     090H            ;This port is used for info signals
00A0 =                  PORT2:      EQU     0A0H            ;This port reads the DIP switches
00B0 =                  PORT3:      EQU     0B0H            ;This port only used RxD for MIDI 0060 =                  KEY_LIST:   EQU     060H            ;Base of list of keys on,len from .HDR|

0020 =                  SERIAL_PUT: EQU     020H            ;Put character in serial buffer
0021 =                  SERIAL_GET: EQU     021H            ;Get character from serial buffer
0022 =                  RUNNING:    EQU     022H            ;Running command
0023 =                  CHANNEL:    EQU     023H            ;Operating channel number
0024 =                  BOARDS:     EQU     024H            ;Storage for number of boards attached|
0025 =                  LEDS:       EQU     025H            ;Storage for number of LEDs attached
0026 =                  ERROR:      EQU     026H            ;Error register storage
0027 =                  TEMP:       EQU     027H            ;Temporary storage for Key Off
0028 =                  DIP_SWITCH: EQU     028H            ;Storage of DIP switches for configure|
0029 =                  ACCUM_SAVE: EQU     029H            ;Accumulator save for interrupts
002A =                  PSW_SAVE:   EQU     02AH            ;PSW save for interrupt routines
002B =                  KEYS_ON:    EQU     02BH            ;Count of number of keys currently on
002C =                  CHAN_CTRL:  EQU     02CH            ;Channel control byte 0040 =                  SERIAL_BUF: EQU     040H            ;Base of serial buffer
005F =                  SERIAL_TOP: EQU     05FH            ;Top of serial buffer
                                                            ;(This byte is not in the buffer)

;----------------------------------------------------------------
                        ;Programme map                                                   |
                        ;----------------------------------------------------------------
                        ;    _0_ _1_ _2_ _3_ _4_ _5_ _6_ _7_ _8_ _9_ _A_ _B_ _C_ _D_ _E_ _F_

;70: P   r   o   c   e   s   s   o   r   -   -   S   t   a   c   k

;60: K e y s _ o n   l i s t   a r r a y - - ( max 16 )

;50: S e r i a l - - i n p u t - - s t r e a m - - b u f f e r

;40: S e r i a l - - i n p u t - - s t r e a m - - b u f f e r

;30: R e s e r v e d     f o r      i e c m - 5 1    m o n i t o r

;20: S_P S_G RUN CHN BRD LED ERR TMP DIP A_S P_S K_O C_C --- reservd

;10: Normal  working  register  bank --- --- --- --- --- --- --- ---

;00: --- --- --- --- --- --- --- --- Serial interrupt register bank

0000                    PAGE

;----------------------------------------------------------------
                        ;MIDI-Light bit addresses                                        |
                        ;----------------------------------------------------------------
0097 =                  RESET_LEDS: EQU     097H            ;A low pulse -_- will reset the LEDs
0093 =                  DATA:       EQU     093H            ;This is the data to be sent to PLAs
0092 =                  CLK_HI:     EQU     092H            ;A low pulse -_- will clock the PLAs
0091 =                  CLK_MID:    EQU     091H            ;A low pulse -_- will clock the PLAs
0090 =                  CLK_LO:     EQU     090H            ;A low pulse -_- will clock the PLAs
00A7 =                  UP_OCT:     EQU     0A7H            ;DIP switch 7
00A6 =                  DOWN_OCT:   EQU     0A6H            ;DIP switch 6

0000                    PAGE

;****************************************************************
                        ;* MIDI-Light main programme                                     *
                        ;****************************************************************
                        ;
0000                              ORG     0                 ;Begin address of programme 0000 C3                 START:    CLR     C                 ;Reset carry flag
0000 =                  IF SHELL_DEVELOP
                                  LJMP    BEGIN             ;Beginning of programme
                        ELSE
0001 61A2                         AJMP    BEGIN             ;For 8751
                        ENDI ;================================================================
                        ;Serial Interrupt Vector = 0023H                                 |
                        ;================================================================
```

```
0023                    ;                                       ;serial interrupt 0023 0202DF             SERINT:    LJMP    SERIAL_INT           ;And now a word in our serial sponser
0026 32                 RET_INT:   RETI                         ;Return from interrupt 0000 =                  ;----------------------------------------------------------------
                        IF SHELL_DEVELOP                        ;For EV80C51FX, simulate programme at 2000H
                                    ORG     2033H               ;Beginning of programme
                        ELSE                                    ;For final product, begin programme at 0
0033                                ORG     0033H               ;Beginning of programme for 8751
                        ENDI                                    ;End of conditional ORG statements

0033                    PAGE

;*****************************************************************
                        ;* Before library modules, load data tables                      *
                        ;*****************************************************************

0033                    BOARD_TABLE:                            ;Number of boards is index...
0033 0018304858                    DFB    0,18H,30H,48H,58H    ;Number of LEDs available on strip
                                                                ;----------------------------------
                                                                ;0 boards:  0 LEDs
                                                                ;1 board :  24 LEDs
                                                                ;2 boards:  48 LEDs
                                                                ;3 boards:  72 LEDs
                                                                ;4 boards:  88 LEDs (Full size support)
                                                                ;----------------------------------

0038                    BOARD_SHIFT:                            ;Number of boards is index...
0038 003C24180C                    DFB    0,3CH,24H,18H,0CH    ;Shift to adjust key number to match
                                                                ;----------------------------------
                                                                ;0 boards:  0  - no shift
                                                                ;1 board :  60 - start at middle C (C4)
                                                                ;2 boards:  36 - C4 in middle of 4 oct
                                                                ;3 boards:  24 - C4 in middle of 6 oct
                                                                ;4 boards:  12 - C4 in middle of 8 oct
                                                                ;----------------------------------

003D                    PAGE

003D                    LED_TO_BOARD:                           ;LED number to find board
003D F1F1F1F1F1                    DFB    0F1H,0F1H,0F1H,0F1H,0F1H,0F1H,0F1H,0F1H ;Board 0: 1111 0001
0045 F1F1F1F1F1                    DFB    0F1H,0F1H,0F1H,0F1H,0F1H,0F1H,0F1H,0F1H ;Board 0
004D F1F1F1F1F1                    DFB    0F1H,0F1H,0F1H,0F1H,0F1H,0F1H,0F1H,0F1H ;Board 0

0055 F2F2F2F2F2                    DFB    0F2H,0F2H,0F2H,0F2H,0F2H,0F2H,0F2H,0F2H ;Board 1: 1111 0010
005D F2F2F2F2F2                    DFB    0F2H,0F2H,0F2H,0F2H,0F2H,0F2H,0F2H,0F2H ;Board 1
0065 F2F2F2F2F2                    DFB    0F2H,0F2H,0F2H,0F2H,0F2H,0F2H,0F2H,0F2H ;Board 1

006D F4F4F4F4F4                    DFB    0F4H,0F4H,0F4H,0F4H,0F4H,0F4H,0F4H,0F4H ;Board 2: 1111 0100
0075 F4F4F4F4F4                    DFB    0F4H,0F4H,0F4H,0F4H,0F4H,0F4H,0F4H,0F4H ;Board 2
007D F4F4F4F4F4                    DFB    0F4H,0F4H,0F4H,0F4H,0F4H,0F4H,0F4H,0F4H ;Board 2

0085 F8F8F8F8F8                    DFB    0F8H,0F8H,0F8H,0F8H,0F8H,0F8H,0F8H,0F8H ;Board 3: 1111 1000
008D F8F8F8F8F8                    DFB    0F8H,0F8H,0F8H,0F8H,0F8H,0F8H,0F8H,0F8H ;Board 3

0095                    LED_TO_SEL:                             ;LED number to find select
0095 0010203040                    DFB    00H,10H,20H,30H,40H,50H,60H,70H
009D 0010203040                    DFB    00H,10H,20H,30H,40H,50H,60H,70H
00A5 0010203040                    DFB    00H,10H,20H,30H,40H,50H,60H,70H
00AD 0010203040                    DFB    00H,10H,20H,30H,40H,50H,60H,70H
00B5 0010203040                    DFB    00H,10H,20H,30H,40H,50H,60H,70H
00BD 0010203040                    DFB    00H,10H,20H,30H,40H,50H,60H,70H
00C5 0010203040                    DFB    00H,10H,20H,30H,40H,50H,60H,70H
00CD 0010203040                    DFB    00H,10H,20H,30H,40H,50H,60H,70H
00D5 0010203040                    DFB    00H,10H,20H,30H,40H,50H,60H,70H
00DD 0010203040                    DFB    00H,10H,20H,30H,40H,50H,60H,70H
00E5 0010203040                    DFB    00H,10H,20H,30H,40H,50H,60H,70H.

00ED                    LED_TO_CLK:                             ;LED number to select CLK pulse
00ED FEFEFEFEFE                    DFB    0FEH,0FEH,0FEH,0FEH,0FEH,0FEH,0FEH,0FEH
00F5 FDFDFDFDFD                    DFB    0FDH,0FDH,0FDH,0FDH,0FDH,0FDH,0FDH,0FDH
00FD FBFBFBFBFB                    DFB    0FBH,0FBH,0FBH,0FBH,0FBH,0FBH,0FBH,0FBH
0105 FEFEFEFEFE                    DFB    0FEH,0FEH,0FEH,0FEH,0FEH,0FEH,0FEH,0FEH
010D FDFDFDFDFD                    DFB    0FDH,0FDH,0FDH,0FDH,0FDH,0FDH,0FDH,0FDH
0115 FBFBFBFBFB                    DFB    0FBH,0FBH,0FBH,0FBH,0FBH,0FBH,0FBH,0FBH
011D FEFEFEFEFE                    DFB    0FEH,0FEH,0FEH,0FEH,0FEH,0FEH,0FEH,0FEH
0125 FDFDFDFDFD                    DFB    0FDH,0FDH,0FDH,0FDH,0FDH,0FDH,0FDH,0FDH
012D FBFBFBFBFB                    DFB    0FBH,0FBH,0FBH,0FBH,0FBH,0FBH,0FBH,0FBH
0135 FEFEFEFEFE                    DFB    0FEH,0FEH,0FEH,0FEH,0FEH,0FEH,0FEH,0FEH
013D FDFDFDFDFD                    DFB    0FDH,0FDH,0FDH,0FDH,0FDH,0FDH,0FDH,0FDH 0145                    BIT_TABLE:                              ;Eigth bits
0145 0102040810                    DFB    01H,02H,04H,08H,10H,20H,40H,80H

014D                    PAGE
```

```
            ;************************************************************************
            ;* Before main programme, load in support library modules                *
            ;************************************************************************
            ;
014D        INCL    "MIDI.LIB"                  ;Install MIDI reading routines here
            ;MIDI.LIB
014D        TITL    "MIDI.LIB library for MIDI input"
            ;8051 support routine for MIDI interface
014D        PAGE ;========================================================================
            ;MIDISP - MIDI state processor to handle MIDI commands
            ;------------------------------------------------------------------------
            ;Input:   Accumulator contains a valid serial character from MIDI
            ;Process: Use current state as pointer into index for table-based
            ;         jump to appropriate state handler.  See state handlers
            ;         for information on each state.
            ;Output:  -NONE-
            ;------------------------------------------------------------------------
014D        MIDISP:
014D FD              MOV     R5,A            ;Get in character register
014E B4FF02          CJNE    A,#0FFH,MIDISP0 ;System reset?
0151 61A2            AJMP    BEGIN           ;Yes, reset system 0153        MIDISP0:
0153 B4F802          CJNE    A,#0F8H,MIDISP1 ;Timing Clock?
0156 2172            AJMP    EXIT_MIDI       ;Yes, ignore byte 0158        MIDISP1:
0158 B4FE02          CJNE    A,#0FEH,MIDISP2 ;Active sensing?
015B 2172            AJMP    EXIT_MIDI       ;Yes, ignore byte 015D        MIDISP2:
015D B4F702          CJNE    A,#0F7H,MIDISP3 ;End of MIDI system exclusive
0160 4194            AJMP    STATE_A         ;Yes, goto state A

0162        MIDISP3:
0162 B4F000          CJNE    A,#0F0H,MIDISP4 ;<F0?

0165        MIDISP4:
0165 5006            JNC     C_EXIT_MIDI     ;Not < F0, exit 0167 EC              MOV     A,R4            ;State in accumulator
0168 900173          MOV     DPTR,#MIDI_TABLE ;Point into MIDI vector table
016B 23              RL      A               ;A*2
016C 73              JMP     @A+DPTR         ;Enter table + 2 * MIDI_STATE 016D        C_EXIT_MIDI:                     ;Clear state to exit MIDI State Processor
016D 7C00            MOV     R4,#0           ;No state
016F 752200          MOV     RUNNING,#0      ;No running command
0172        EXIT_MIDI:                       ;End of MIDI processing
0172 22              RET                     ;Done 0173        MIDI_TABLE:                      ;Table for MIDI state processing
0173 218C    M0:     AJMP    STATE_0         ;Go to state 0 processing
0175 21E2    M1:     AJMP    STATE_1         ;Go to state 1 processing
0177 410E    M2:     AJMP    STATE_2         ;Go to state 2 processing
0179 411D    M3:     AJMP    STATE_3         ;Go to state 3 processing
017B 412B    M4:     AJMP    STATE_4         ;Go to state 4 processing
017D 4157    M5:     AJMP    STATE_5         ;Go to state 5 processing
017F 416B    M6:     AJMP    STATE_6         ;Go to state 6 processing
0181 4174    M7:     AJMP    STATE_7         ;Go to state 7 processing
0183 417D    M8:     AJMP    STATE_8         ;Go to state 8 processing
0185 218C    M9:     AJMP    STATE_0         ;Go to state 0 processing
0187 4194    MA:     AJMP    STATE_A         ;Go to state A processing
0189 020000          LJMP    START           ;

018C        PAGE

;************************************************************************
            ;* MIDI State 0 processing - get initial command or running             *
            ;************************************************************************
            ;========================================================================
            ;STATE_0 - MIDI state 0 to get initial command or running command
            ;------------------------------------------------------------------------
            ;Input:   R5 contains the character from MIDI to be processed
            ;Process: Check the charater to see if it is a command or a
            ;         follow-up to a previous command.  A new command is
            ;         processed here. A running command is dispatched to the
            ;         command in the RUNNING variable.
            ;Output:  R4 contains the next state to process.
            ;------------------------------------------------------------------------
018C        STATE_0:                         ;Get either running or new command
018C ED              MOV     A,R5            ;Restore accumulator
018D 20E71B          JB      ACC.7,ST0_5     ;Not a running key, new command
0190 E522            MOV     A,RUNNING       ;Get the running command (80/90/B0/F0)
```

```
0192 B49002              CJNE   A,#90H,STO_0   ;Jump if not key on
0195 412B         STO_0: AJMP   STATE_4        ;Value of key to turn on 0197              STO_0:                       ;Not key on so look for key off
0197 B48002              CJNE   A,#80H,STO_1   ;Jump if not key off
019A 21E2                AJMP   STATE_1        ;Value of key to turn off 019C              STO_1:                       ;Not key off so look for channel mode message
019C B4B002              CJNE   A,#0B0H,STO_2  ;Jump if not Channel mode message
019F 411D                AJMP   STATE_3        ;Get mode message 01A1              STO_2:                       ;Not channel mode message, look for MIDI exclusiv
01A1 B4F002              CJNE   A,#0F0H,STO_3  ;Jump if not MIDI exclusive beginning
01A4 4174                AJMP   STATE_7        ;Get MIDI ID 01A6              STO_3:    ;room here for upgrades in new commands.

01A6              STO_4:                       ;Not found as a command in RUNNING
01A6 432640              ORL    ERROR,#40H     ;ERROR, UNKNOWN
01A9 2172                AJMP   EXIT_MIDI      ;DONE 01AB              STO_5:                       ;New command processor!
01AB ED                  MOV    A,R5           ;Get character in accumulator
01AC 54F0                ANL    A,#0F0H        ;Look for COMMAND only, for generic channels
01AE B4B006              CJNE   A,#0B0H,STO_6  ;Jump if not channel mode message
01B1 F522                MOV    RUNNING,A      ;Running command is channel mode message
01B3 7C03                MOV    R4,#3          ;mode message command
01B5 2172                AJMP   EXIT_MIDI      ;Done 01B7              STO_6:                       ;Look at MIDI channels
01B7 ED                  MOV    A,R5           ;Get character in accumulator
01B8 540F                ANL    A,#0FH         ;Look at channel
01BA 519B                ACALL  ASK_CHNL       ;See if channel is on
01BC 501F                JNC    STO_A          ;No carry, channel not on, ignore message 01BE              STO_7:                       ;Accept channel
01BE ED                  MOV    A,R5           ;Get character in accumulator
01BF 54F0                ANL    A,#0F0H        ;Look at command only
01C1 B48006              CJNE   A,#80H,STO_8   ;If not key off(80), try 90
01C4 F522                MOV    RUNNING,A      ;Running command is key off 01C6 7C01                MOV    R4,#1          ;Key off command
01C8 2172                AJMP   EXIT_MIDI      ;Done 01CA              STO_8:                       ;Not key off, so try key on
01CA B49006              CJNE   A,#90H,STO_9   ;If not key on(90), try F0
01CD F522                MOV    RUNNING,A      ;Running command is key on
01CF 7C04                MOV    R4,#4          ;Key on command
01D1 2172                AJMP   EXIT_MIDI      ;Done 01D3              STO_9:                       ;Not key on, so try system exclusive
01D3 B4F007              CJNE   A,#0F0H,STO_A  ;If not system exclusive(F0), leave
01D6 752200              MOV    RUNNING,#0     ;Running command = 0
01D9 7C07                MOV    R4,#7          ;Look for MIDI ID
01DB 2172                AJMP   EXIT_MIDI      ;Done 01DD              STO_A:                       ;Ignore the stupid thing if I can't find it!
01DD 752200              MOV    RUNNING,#0     ;Running command = 0
01E0 2172                AJMP   EXIT_MIDI      ;BYE!
01E2              PAGE ;****************************************************************************
;* MIDI state 1 processing - get key value for turn off                      *
;****************************************************************************
01E2              STATE_1:                     ;MIDI state 1 processing
01E2 BD8000              CJNE   R5,#80H,ST1_0  ;If (R5)<80H, C=1 - (R5) >= 80 is new cmd 01E5              ST1_0:
01E5 5020                JNC    ST1_2          ;No, Bad byte
01E7 7C02                MOV    R4,#2          ;MIDI in state 2: key off state
01E9 ED                  MOV    A,R5           ;Key in accumulator
01EA C3                  CLR    C              ;Clear for subtract
01EB 20A704              JB     UP_OCT,ST1_0a  ;If bit set, do not go up 1 octave
01EE 940C                SUBB   A,#0CH         ;Shift by 1 octave
01F0 4018                JC     ST1_3          ;Key went out of range 01F2              ST1_0a:                      ;Test to go down one octave
01F2 20A604              JB     DOWN_OCT,ST1_0b ;If bit set, do not go down 1 octave
01F5 240C                ADD    A,#0CH         ;Shift by 1 octave
01F7 4011                JC     ST1_3          ;Key went out of range 01F9              ST1_0b:                      ;Test for validity of key value
01F9 C3                  CLR    C              ;Clear for subtract
01FA 9E                  SUBB   A,R6           ;Scale key
01FB 400D                JC     ST1_3          ;If carry set, key went out of range
01FD B52502              CJNE   A,LEDS,ST1_1   ;<LEDS?
0200 4104                AJMP   ST1_1a         ;=LEDS
```

```
0202            ST1_1:                          ;Carry flag set for valid key value
0202 5003               JNC     ST1_2           ;No, key out of range 0204            ST1_1a:                         ;Valid key value
0204 FB                 MOV     R3,A            ;Set key number
0205 2172               AJMP    EXIT_MIDI       ;Done 0207            ST1_2:                          ;Bad byte
0207 432680             ORL     ERROR,#80H      ;Set error bit 020A            ST1_3:                          ;Error in key value
020A 7C00               MOV     R4,#0           ;Clear state
020C 2172               AJMP    EXIT_MIDI       ;Done ;****************************************************************
                ;* MIDI state 2 processing - get rate value for turn off        *
                ;****************************************************************
020E            STATE_2:                        ;Rate value of MIDI message
020E EB                 MOV     A,R3            ;Get key number in accumulator
020F 7C00               MOV     R4,#0           ;Acceptance state
0211 BD8000             CJNE    R5,#80H,ST2_0   ;<80?

0214            ST2_0:
0214 5002               JNC     ST2_1           ;No, bad byte
0216 613B               AJMP    KEY_OFF         ;Turn key number LED off and return 0218            ST2_1:                          ;Bad byte
0218 432680             ORL     ERROR,#80H      ;Set error bit
021B 2172               AJMP    EXIT_MIDI       ;Done
021D            PAGE ;****************************************************************
                ;* MIDI state 3 processing - get type of channel mode message   *
                ;****************************************************************
021D            STATE_3:                        ;MIDI state 1 processing
021D BD7B04             CJNE    R5,#7BH,ST3_0   ;If (R5)!=123, mode message is not all notes of
0220 7C06               MOV     R4,#6           ;Look for the end of the message
0222 2172               AJMP    EXIT_MIDI       ;Done 0224            ST3_0:                          ;Look for continuous controller
0224 7C00               MOV     R4,#0           ;Clear state
0226 752200             MOV     RUNNING,#0      ;Clear running command
0229 2172               AJMP    EXIT_MIDI       ;Done

022B            PAGE

;****************************************************************
                ;* MIDI state 4 processing - get key value for turn on          *
                ;****************************************************************
022B            STATE_4:                        ;Get key number for key on message
022B BD8000             CJNE    R5,#80H,ST4_0   ;<80H?

022E            ST4_0:
022E 5020               JNC     ST4_3           ;No, bad byte
0230 7C05               MOV     R4,#5           ;MIDI in state 5: key on rate
0232 ED                 MOV     A,R5            ;Key in accumulator
0233 C3                 CLR     C               ;Clear for subtract
0234 20A704             JB      UP_OCT,ST4_0a   ;If bit set, do not go up 1 octave
0237 940C               SUBB    A,#0CH          ;Shift by 1 octave
0239 4018               JC      ST4_4           ;Key went out of range 023B            ST4_0a:
023B 20A604             JB      DOWN_OCT,ST4_0b ;If bit set, do not go down 1 octave
023E 240C               ADD     A,#0CH          ;Shift by 1 octave
0240 4011               JC      ST4_4           ;Key went out of range 0242            ST4_0b:
0242 C3                 CLR     C               ;Clear for subtract
0243 9E                 SUBB    A,R6            ;Scale key
0244 400D               JC      ST4_4           ;If carry set, key out of range
0246 B52502             CJNE    A,LEDS,ST4_1    ;Smaller than LEDs?
0249 414D               AJMP    ST4_2           ;Equal to LEDs 024B            ST4_1:
024B 5006               JNC     ST4_4           ;No, key out of range 024D            ST4_2:
024D FB                 MOV     R3,A            ;Set key number
024E 2172               AJMP    EXIT_MIDI       ;Done 0250            ST4_3:                          ;Bad byte
0250 432680             ORL     ERROR,#80H      ;Set error bit 0253            ST4_4:                          ;Key out of range
0253 7C00               MOV     R4,#0           ;Clear state
0255 2172               AJMP    EXIT_MIDI       ;Done
```

```
        ;****************************************************************
        ;* MIDI state 5 processing - get rate value for turn on          *
        ;****************************************************************
0257            STATE_5:                        ;MIDI state 5 processing
0257 EB                 MOV    A,R3             ;Get key number in accumulator
0258 7C00              MOV    R4,#0            ;Acceptance state
025A BD8000            CJNE   R5,#80H,ST5_0    ;<80?

025D            ST5_0:
025D 5007              JNC    ST5_2            ;No, bad byte
025F BD0002            CJNE   R5,#0,ST5_1      ;>0, turn on
0262 613B              AJMP   KEY_OFF          ;=0, turn key number LED off 0264            ST5_1:
0264 6163              AJMP   KEY_ON           ;Turn key on 0266            ST5_2:                          ;Bad byte
0266 432680            ORL    ERROR,#80H       ;Set error bit
0269 2172              AJMP   EXIT_MIDI        ;Done
026B            PAGE ;****************************************************************
        ;* MIDI state 6 processing - get end of all notes off message   *
        ;****************************************************************
026B            STATE_6:                        ;MIDI state 6 processing
026B BD0002            CJNE   R5,#0,ST6_0      ;If (R5)!=0, mode message is not correct ending 026E 711E              ACALL  RESET_INDICATORS ;Entire all notes off for any channel rcvd 0270            ST6_0:                          ;End of all notes off generic message
0270 7C00              MOV    R4,#0            ;Clear state
0272 2172              AJMP   EXIT_MIDI        ;Done

0274            PAGE

;****************************************************************
        ;* MIDI state 7 processing - get MIDI exclusive ID              *
        ;****************************************************************
0274            STATE_7:                        ;MIDI channels 9-15 on/off control
0274 BD1F04            CJNE   R5,#1FH,ST7_0    ;Test for valid value, jump if not Softronics
0277 7C08              MOV    R4,#8            ;Go to state 8 next
0279 2172              AJMP   EXIT_MIDI        ;Done 027B            ST7_0:                          ;Result of test was bad
027B 216D              AJMP   C_EXIT_MIDI      ;Done ;****************************************************************
        ;* MIDI state 8 processing - get channel to turn on             *
        ;****************************************************************
027D            STATE_8:                        ;MIDI channels 1-7 on/off control
027D BD8000            CJNE   R5,#80H,ST8_0    ;Test for valid value 0280            ST8_0:                          ;Result of test
0280 5010              JNC    ST8_3            ;Jump if invalid data
0282 7C0A              MOV    R4,#0AH          ;MIDI state A
0284 BD1000            CJNE   R5,#10H,ST8_1    ;Test if valid channel 0287            ST8_1:                          ;Result of channel test
0287 5005              JNC    ST8_2            ;DIP channel
0289 ED                MOV    A,R5             ;Put valid data
028A 51AD              ACALL  CHNL_ON          ;Turn channel on
028C 2172              AJMP   EXIT_MIDI        ;Done 028E            ST8_2:                          ;Return to DIP switches
028E 51A3              ACALL  CHNL_OFF         ;Turn of MIDI channel
0290 2172              AJMP   EXIT_MIDI        ;Done 0292            ST8_3:                          ;Bad data
0292 216D              AJMP   C_EXIT_MIDI      ;Abort MIDI exclusive

0294            PAGE

;****************************************************************
        ;* MIDI state A processing - EXECUTE SOFTRONICS COMMAND         *
        ;****************************************************************
0294            STATE_A:                        ;MIDI state A processing
0294 BDF702            CJNE   R5,#0F7H,STA_0   ;Ignore non-end characters
0297 216D              AJMP   C_EXIT_MIDI      ;Done 0299            STA_0:                          ;Not end of exclusive message
0299 2172              AJMP   EXIT_MIDI        ;Try again

029B            PAGE
```

```
                ;********************************************************************
                ;* MIDI channel turn off/on routines                                 *
                ;********************************************************************
                ;====================================================================
                ;ASK_CHNL - ASK if MIDI channel is on                                |
                ;--------------------------------------------------------------------
                ;Input:   A contains number of MIDI channel to turn check            |
                ;Process: Table look up to referance CHAN_LO and CHAN_HI bytes       |
                ;Output:  C=0 if channel is off, c=1 if channel is on                |
                ;--------------------------------------------------------------------
029B            ASK_CHNL:                    ;Ask if MIDI channel is on             |
029B B52303              CJNE  A,CHANNEL,ASK_0 ;Same channel?                       |

029E D3                  SETB  C             ;Yes, set carry                        |
029F 41A2                AJMP  ASK_1         ;Exit                                  |

02A1            ASK_0:
02A1 C3                  CLR   C             ;Channel not on, clear carry           |

02A2            ASK_1:
02A2 22                  RET                 ;Done                                  |

;--------------------------------------------------------------------
                ;CHNL_OFF - MIDI channel turned off                                  |
                ;--------------------------------------------------------------------
                ;Input:   A contains number of MIDI channel to turn off              |
                ;Process: Table look up to referance CHAN_LO and CHAN_HI bytes       |
                ;Output:  -NONE-                                                     |
                ;--------------------------------------------------------------------
02A3            CHNL_OFF:                    ;Turn MIDI channel off                 |
02A3 E5A0                MOV   A,PORT2       ;Read DIP switches                     |
02A5 540F                ANL   A,#0FH        ;Channels only                         |
02A7 F523                MOV   CHANNEL,A     ;Save new channel                      |
02A9 752C00              MOV   CHAN_CTRL,#0  ;Clear flag                            |
02AC 22                  RET                 ;Done                                  |

;--------------------------------------------------------------------
                ;CHNL_ON - MIDI channel turned on                                    |
                ;--------------------------------------------------------------------
                ;Input:   A contains number of MIDI channel to turn off              |
                ;Process: Table look up to referance CHAN_LO and CHAN_HI bytes       |
                ;Output:  -NONE-                                                     |
                ;--------------------------------------------------------------------
02AD            CHNL_ON:                     ;Turn MIDI channel on                  |
02AD F523                MOV   CHANNEL,A     ;Save channel                          |
02AF 752CFF              MOV   CHAN_CTRL,#0FFH ;Set flag                            |
02B2 22                  RET                 ;Done                                  |

;End of MIDI processing module!
02B3            INCL    "SERIAL.LIB"                ;Install serial port routines here |
                ;SERIAL.LIB
02B3            TITL "SERIAL.LIB library for MIDI interface"
                ;8051 support routines
02B3            PAGE ;====================================================================
                ;SET_SERIAL ROUTINES TO INITIALIZE SERIAL PORT                       |
                ;--------------------------------------------------------------------
                ;Input:   -NONE-                                                     |
                ;Process: ENABLE INTERRUPTS, SET RATE, MODE, AND POINTERS            |
                ;OUTPUT:  -NONE-                                                     |
                ;--------------------------------------------------------------------
02B3            SET_SERIAL:                  ;SETUP SERIAL DRIVER
02B3 D2AF                SETB  EA            ;ENABLE INTERRUPTS
02B5 D2AC                SETB  ES            ;ENABLE SERIAL INTERRUPTS 0000 =              IF SERIAL_DEVELOP==2416H ;DEVELOPMENT ROUTINE, BAUD 2400,16MHz
                        MOV   TH1,#0DDH      ;SET BAUD USING TIMER 1
                        ORL   PCON,#80H      ;SMOD = 1 (K=2)
                    ENDI 0000 =              IF SERIAL_DEVELOP==2412H ;DEVELOPMENT ROUTINE, BAUD 2400,12MHz
                        MOV   TH1,#0E6H      ;SET BAUD USING TIMER 1
                        ORL   PCON,#80H      ;SMOD = 1 (K=2)
                    ENDI 0001 =              IF SERIAL_DEVELOP==3112H ;PRODUCTION ROUTINE, BAUD 32125,12MHz
02B7 758DFF             MOV   TH1,#0FFH      ;AT 31.25K USING TIMER 1
02BA 53877F             ANL   PCON,#7FH      ;SMOD = 0 (K=1)
                    ENDI 02BD 758920              MOV   TMOD,#20H     ;TIMER 1,MODE 2
02C0 D28E                SETB  TCON.6        ;ENABLE TIMER 1
02C2 752040              MOV   SERIAL_PUT,#SERIAL_BUF ;BASE SERIAL BUFFER ADDRESS
```

```
02C5 752140              MOV    SERIAL_GET,#SERIAL_BUF ;BASE SERIAL BUFFER ADDRESS
02C8 22                  RET                    ;DONE
02C9           PAGE

;================================================================
               ;GETSCH GET A SERIAL CHRACTER FROM THE BUFFER                    |
               ;----------------------------------------------------------------
               ;Input:   -NONE-                                                 |
               ;Process: LOOK FOR AVAILABILITY OF A CHARACTER IN SERIAL BUFFER  |
               ;OUTPUT:  A CHARACTER IN ACCUMULATOR, CARRY FLAG CLEAR           |
               ;         OR-- A NULL UN ACC, CARRY FLAG SET IF NO CHARACTER READY|
               ;----------------------------------------------------------------
02C9 E521      GETSCH:   MOV    A,SERIAL_GET       ;SERIAL GET
02CB B52005              CJNE   A,SERIAL_PUT,SER0  ;IF GET = PUT, ERROR!
02CE 7400                MOV    A,#0               ;NO CHARACTER
02D0 D3                  SETB   C                  ;ERROR!
02D1 41DE                AJMP   SER2               ;EXIT SECTION
02D3 F8        SER0:     MOV    R0,A               ;GET POINTER
02D4 E6                  MOV    A,@R0              ;READ CHARACTER
02D5 08                  INC    R0                 ;INCREMENT POINTER
02D6 B86002              CJNE   R0,#SERIAL_TOP+1,SER1 ;OVERRUN?
02D9 7840                MOV    R0,#SERIAL_BUF     ;YES, CLEAR
02DB 8821      SER1:     MOV    SERIAL_GET,R0      ;SAVE
02DD C3                  CLR    C                  ;NO ERROR
02DE 22        SER2:     RET                       ;END OF SERIAL READER
02DF           PAGE ;*****************************************************************
               ;* SERIAL INTERRUPT ROUTINE FOR MIDI INPUT                       *
               ;*****************************************************************
               ;----------------------------------------------------------------
               ;Input:   -NONE-                                                 |
               ;Process: READ A CHARACTER FROM SBUF REG AND PUT INTO BUFFER     |
               ;OUTPUT:  -NONE-                                                 |
               ;----------------------------------------------------------------
02DF           SERIAL_INT:                         ;SERIAL INTERRUPT HANDLER
02DF 85D02A              MOV    PSW_SAVE,PSW       ;SAVE PSW
02E2 F529                MOV    ACCUM_SAVE,A       ;SAVE ACCUMULATOR
02E4 D2D3                SETB   RS0                ;SELECT REGISTERS
02E6 C2D4                CLR    RS1                ;BANK 1

02E8 209A05              JB     RB8,SERINT0        ;VALID CHARACTER
02EB 434001              ORL    40H,#1H            ;ERROR, FRAMING - RB8 WAS NOT 1
02EE 6115                AJMP   SERINT3            ;LEAVE INTERRUPT ROUTINE

02F0 A820     SERINT0:   MOV    R0,SERIAL_PUT      ;SERIAL CHR PUT ADDRESS
02F2 A699                MOV    @R0,SBUF           ;SO PUT IT THERE
02F4 08                  INC    R0                 ;INCREMENT INDEX
02F5 B86002              CJNE   R0,#SERIAL_TOP+1,SERINT1 ;TOO FAR?
02F8 7840                MOV    R0,#SERIAL_BUF     ;YES, RESET

02FA E8       SERINT1:   MOV    A,R0               ;TEST CRASH OF SERIAL
02FB B52115              CJNE   A,SERIAL_GET,SERINT2 ;CRASH IF EQUAL
02FE 7840                MOV    R0,#SERIAL_BUF     ;BASE OF BUFFER 0300 7600     SERINT1a:  MOV    @R0,#0H            ;CLEARING BUFFER
0302 B85F04              CJNE   R0,#SERIAL_TOP,SERINT1b ;EXIT IF AT TOP
0305 08                  INC    R0                 ;NEXT IN BUFFER
0306 B840F7              CJNE   R0,#SERIAL_BUF,SERINT1a ;DO ENTIRE LOOP 0309 752040   SERINT1b:  MOV    SERIAL_PUT,#SERIAL_BUF ;RESTART PUT
030C 752140              MOV    SERIAL_GET,#SERIAL_BUF ;RESTART GET
030F 711E                ACALL  RESET_INDICATORS   ;TURN ALL LEDS OFF
0311 6115                AJMP   SERINT3            ;EXIT INTERRUPT 0313 8820     SERINT2:   MOV    SERIAL_PUT,R0      ;NEW POINTER
0315 E529     SERINT3:   MOV    A,ACCUM_SAVE       ;RESTORE ACCUMULATOR
0317 852AD0              MOV    PSW,PSW_SAVE       ;RESTORE PSW
031A 759850              MOV    SCON,#50H          ;RE-ENABLE SERIAL DEVICE
031D 32                  RETI                      ;AND NOW, BACK TO OUR PROGRAMME!
031E           INCL   "DISPLAY.LIB"                ;Install display routines here
               ;DISPLAY.LIB
031E           TITL "DISPLAY.LIB library for display output"
               ;8051 support routines for LED display driver
031E           PAGE ;----------------------------------------------------------------
               ;Input:   -NONE-                                                 |
               ;Process: Send RESET to indicator boards and clear list          |
               ;Output:  -NONE-                                                 |
               ;----------------------------------------------------------------
031E           RESET_INDICATORS:                   ;Reset indicator boards 031E           LEDS_OFF:                           ;Turn off all LEDs
031E C297                CLR    RESET_LEDS         ;0 reset line to LEDs
```

```
0320 7580F0              MOV   PORT0,#0F0H    ;Enable all boards
0323 E590                MOV   A,PORT1        ;Get control port
0325 54F8                ANL   A,#0F8H        ;Fire all clock pulses
0327 F590                MOV   PORT1,A        ;Send clock pulses
0329 747F                MOV   A,#07FH        ;Clear clock pulses
032B F590                MOV   PORT1,A        ;Send all pulses end
032D D297                SETB  RESET_LEDS     ;Okay, that's enough
032F 752B00              MOV   KEYS_ON,#0     ;Clear number of LEDs currently on 0332 7860                MOV   R0,#KEY_LIST   ;Point to bottom of list
0334          TD0:                            ;Clear key buffer
0334 76FF                MOV   @R0,#0FFH      ;Clear each element of the array
0336 08                  INC   R0             ;Point to next element
0337 B870FA              CJNE  R0,#{KEY_LIST+MAX_LEDS},TD0 ;Test for end of loop
033A 22                  RET                  ;Done

033B          PAGE

;-----------------------------------------------------------------
;Input:   Accumulator has value of LED to turn off
;Process: Use lookup tables in code to control I/O ports
;Output:  -NONE-
;-----------------------------------------------------------------
033B          KEY_OFF:                        ;Turn off LED
033B F527                MOV   TEMP,A         ;Save key value
033D 90003D              MOV   DPTR,#LED_TO_BOARD ;Point to board for LED
0340 93                  MOVC  A,@A+DPTR      ;Get board id number
0341 F580                MOV   P0,A           ;Put to select
0343 E527                MOV   A,TEMP         ;Restore key
0345 900095              MOV   DPTR,#LED_TO_SEL ;Point to select of board
0348 93                  MOVC  A,@A+DPTR      ;Get select from table
0349 4487                ORL   A,#87H         ;Do not reset, data off, all clks off
034B F590                MOV   P1,A           ;Set port 1
034D E527                MOV   A,TEMP         ;Restore key
034F 9000ED              MOV   DPTR,#LED_TO_CLK ;Point to clk for PLAs
0352 93                  MOVC  A,@A+DPTR      ;Get CLK pulse
0353 5590                ANL   A,P1           ;Get ready to strobe CLK
0355 F590                MOV   P1,A           ;GO!
0357 440F                ORL   A,#0FH         ;Get ready to end pulse
0359 F590                MOV   P1,A           ;Stop pulse
035B 74FF                MOV   A,#0FFH        ;Disable to protect from error
035D F590                MOV   P1,A           ;Stop pulse
035F 7580FF              MOV   P0,#0FFH       ;Clear board select lines 0362          KF5:                            ;Done with Key_Off routine
0362 22                  RET                  ;Return from routine
0363          PAGE ;-----------------------------------------------------------------
;Input:   Accumulator has value of LED to turn on
;Process: Use lookup tables in code to control I/O ports
;Output:  -NONE-
;-----------------------------------------------------------------
0363          KEY_ON:                         ;Turn on LED
0363 FF                  MOV   R7,A           ;Save key value
0364 90003D              MOV   DPTR,#LED_TO_BOARD ;Point to board for LED
0367 93                  MOVC  A,@A+DPTR      ;Get board id number
0368 F580                MOV   P0,A           ;Put to select
036A EF                  MOV   A,R7           ;Restore key
036B 900095              MOV   DPTR,#LED_TO_SEL ;Point to select of board
036E 93                  MOVC  A,@A+DPTR      ;Get select from table
036F 448F                ORL   A,#8FH         ;Do not reset, data on, all clks off
0371 F590                MOV   P1,A           ;Set port 1
0373 EF                  MOV   A,R7           ;Restore key
0374 9000ED              MOV   DPTR,#LED_TO_CLK ;Point to clk for PLAs
0377 93                  MOVC  A,@A+DPTR      ;Get CLK pulse
0378 5590                ANL   A,P1           ;Get ready to strobe CLK
037A F590                MOV   P1,A           ;GO!
037C 4407                ORL   A,#07H         ;Get ready to end pulse
037E F590                MOV   P1,A           ;Stop pulse
0380 74FF                MOV   A,#0FFH        ;Disable to protect from error
0382 F590                MOV   P1,A           ;Stop pulse
0384 7580FF              MOV   P0,#0FFH       ;Clear board select lines 0387          KO4:                            ;Done with Key_On routine
0387 22                  RET                  ;Return from routine
0388          PAGE ;-----------------------------------------------------------------
;Input:   -NONE-
;Process: Use I/O ports to count external boards
;Output:  Accumulator has 0-4, number of boards attached
;-----------------------------------------------------------------
0388          TEST_DISPLAY:                   ;Test to find how many boards are on

0000 =        IF SHELL_DEVELOP
```

```
                        ELSE    MOV     R1,#3                   ;for now
0388 E580                       MOV     A,PORT0                 ;Read enable/return port
038A 7900                       MOV     R1,#0                   ;Clear counter
038C 03                         RR      A                       ;Rotate 1 bit
038D 03                         RR      A                       ;. . . 2 bits
038E 03                         RR      A                       ;. . . 3 bits
038F 03                         RR      A                       ;. . . a dollar
0390 13                         RRC     A                       ;Test RET0
0391 400D                       JC      TD1                     ;Carry indicates no board, quit
0393 09                         INC     R1                      ;To 1
0394 13                         RRC     A                       ;Test RET1
0395 4009                       JC      TD1                     ;Carry indicates no board, quit
0397 09                         INC     R1                      ;To 2
0398 13                         RRC     A                       ;Test RET2
0399 4005                       JC      TD1                     ;Carry indicates no board, quit
039B 09                         INC     R1                      ;To 3
039C 13                         RRC     A                       ;Test RET3
039D 4001                       JC      TD1                     ;Carry indicates no board, quit
039F 09                         INC     R1                      ;To 4
                        ENDIF 03A0            TD1:
03A0 E9                         MOV     A,R1                    ;Put in Accumulator!
03A1 22                         RET
                        ;
                        ;----------------------------------------------------------------|

03A2            TITL    "MIDI-LIGHT PROGRAMME: DRIV8051.ASM"
03A2            PAGE

03A2            BEGIN:                                          ;Beginning of main programme
03A2 758173                     MOV     SP,#73H                    ;Bottom of stack segment
03A5 C2D3                       CLR     RS0                        ;Select Register bank
03A7 D2D4                       SETB    RS1                        ;Bank 2
03A9 51B3                       ACALL   SET_SERIAL                 ;Set-up serial port
03AB 7188                       ACALL   TEST_DISPLAY               ;Count boards of display
03AD F524                       MOV     BOARDS,A                   ;Save number of boards being used
03AF E5A0                       MOV     A,PORT2                    ;Read DIP switches
03B1 F528                       MOV     DIP_SWITCH,A               ;Save DIP switches
03B3 120026                     LCALL   RET_INT                    ;Call to restore interrupt service
03B6 759850                     MOV     SCON,#50H                  ;Active serial rutn,mode 2,clear RI&TI
03B9 711E                       ACALL   RESET_INDICATORS           ;Reset indicator boards
03BB 752200                     MOV     RUNNING,#0                 ;Clear running command
03BE 752600                     MOV     ERROR,#0                   ;Clear error 03C1 E524                       MOV     A,BOARDS                   ;Get the number of boards in accumulat
03C3 900033                     MOV     DPTR,#BOARD_TABLE          ;Point to table of LEDs
03C6 93                         MOVC    A,@A+DPTR                  ;Read table to count LEDs
03C7 F525                       MOV     LEDS,A                     ;Save number of LEDs
03C9 E524                       MOV     A,BOARDS                   ;Get the number of boards in accumulat
03CB 900038                     MOV     DPTR,#BOARD_SHIFT          ;Point to table for base shift value
03CE 93                         MOVC    A,@A+DPTR                  ;Read table to find shift value
03CF FE                         MOV     R6,A                       ;Set shift value in register 6

03D0            MIDI_INIT:                                      ;Initialize device MIDI parameters
03D0 7C00                       MOV     R4,#0                      ;No MIDI state status for processor
03D2 752300                     MOV     CHANNEL,#0                 ;MIDI channel = 0 (+1)
03D5 752C00                     MOV     CHAN_CTRL,#0               ;Clear channel control flag 03D8            TOP:                                            ;Top of running loop for programme
03D8 E52C                       MOV     A,CHAN_CTRL                ;Get flags
03DA B4000D                     CJNE    A,#0,TOP_1                 ;Jump if channel under exclusive contr
03DD E5A0                       MOV     A,PORT2                    ;Get port 2
03DF 540F                       ANL     A,#0FH                     ;Channel switches only
03E1 B52302                     CJNE    A,CHANNEL,TOP_0            ;Jump if different channel
03E4 61EA                       AJMP    TOP_1                      ;No channel change 03E6            TOP_0:                                          ;Change channel
03E6 F523                       MOV     CHANNEL,A                  ;Set new channel
03E8 711E                       ACALL   RESET_INDICATORS           ;Turen all LEDs off 03EA            TOP_1:                                          ;Main loop
03EA 51C9                       ACALL   GETSCH                     ;Get serial character
03EC 40EA                       JC      TOP                        ;If Carry set, try again
03EE 314D                       ACALL   MIDISP                     ;If good char, call state processor
03F0 61D8                       AJMP    TOP                        ;Loop

0000                    END

00D6    AC              00E0    ACC             0029    ACCUM_SAVE
02A1    ASK_0           02A2    ASK_1           029B    ASK_CHNL
00F0    B               03A2    BEGIN           0145    BIT_TABLE
0024    BOARDS          0038    BOARD_SHIFT     0033    BOARD_TABLE
0023    CHANNEL         002C    CHAN_CTRL       02A3    CHNL_OFF
```

| | | | | | |
|---|---|---|---|---|---|
| 02AD | CHNL_ON | 0092 | CLK_HI | 0090 | CLK_LO |
| 0091 | CLK_MID | 00D7 | CY | 016D | C_EXIT_MIDI |
| 0093 | DATA | 0028 | DIP_SWITCH | 00A6 | DOWN_OCT |
| 0083 | DPH | 0082 | DPL | 00AF | EA |
| 0026 | ERROR | 00AC | ES | 0172 | EXIT_MIDI |
| 00D5 | F0 | 0000 | FALSE | 02C9 | GETSCH |
| 00A8 | IEC | 00B8 | IPC | 002B | KEYS_ON |
| 0060 | KEY_LIST | 033B | KEY_OFF | 0363 | KEY_ON |
| 0362 | KFS | 0387 | KO4 | 0025 | LEDS |
| 031E | LEDS_OFF | 003D | LED_TO_BOARD | 00ED | LED_TO_CLK |
| 0095 | LED_TO_SEL | 0173 | M0 | 0175 | M1 |
| 0177 | M2 | 0179 | M3 | 017B | M4 |
| 017D | M5 | 017F | M6 | 0181 | M7 |
| 0183 | M8 | 0185 | M9 | 0187 | MA |
| 0010 | MAX_LEDS | 014D | MIDISP | 0153 | MIDISP0 |
| 0158 | MIDISP1 | 015D | MIDISP2 | 0162 | MIDISP3 |
| 0165 | MIDISP4 | 001F | MIDI_ID | 03D0 | MIDI_INIT |
| 0173 | MIDI_TABLE | 00D2 | OV | 00D0 | P |
| 0080 | P0 | 0090 | P1 | 00A0 | P2 |
| 00B0 | P3 | 0087 | PCON | 0080 | PORT0 |
| 0090 | PORT1 | 00A0 | PORT2 | 00B0 | PORT3 |
| 00BC | PS | 00D0 | PSW | 002A | PSW_SAVE |
| 009A | RB8 | 009C | REN | 031E | RESET_INDICATORS |
| 0097 | RESET_LEDS | 0026 | RET_INT | 0098 | RI |
| 00D3 | RS0 | 00D4 | RS1 | 0022 | RUNNING |
| 0099 | SBUF | 0098 | SCON | 02D3 | SER0 |
| 02DB | SER1 | 02DE | SER2 | 2412 | SER2412 |
| 2416 | SER2416 | 3112 | SER3112 | 0040 | SERIAL_BUF |
| 3112 | SERIAL_DEVELOP | 0021 | SERIAL_GET | 02DF | SERIAL_INT |
| 0020 | SERIAL_PUT | 005F | SERIAL_TOP | 0023 | SERINT |
| 02F0 | SERINT0 | 02FA | SERINT1 | 0300 | SERINT1A |
| 0309 | SERINT1B | 0313 | SERINT2 | 0315 | SERINT3 |
| 02B3 | SET_SERIAL | 0000 | SHELL_DEVELOP | 009F | SM0 |
| 009E | SM1 | 009D | SM2 | 0081 | SP |
| 0197 | ST0_0 | 019C | ST0_1 | 01A1 | ST0_2 |
| 01A6 | ST0_3 | 01A6 | ST0_4 | 01AB | ST0_5 |
| 01B7 | ST0_6 | 01BE | ST0_7 | 01CA | ST0_8 |
| 01D3 | ST0_9 | 01DD | ST0_A | 01E5 | ST1_0 |
| 01F2 | ST1_0A | 01F9 | ST1_0B | 0202 | ST1_1 |
| 0204 | ST1_1A | 0207 | ST1_2 | 020A | ST1_3 |
| 0214 | ST2_0 | 0218 | ST2_1 | 0224 | ST3_0 |
| 022E | ST4_0 | 023B | ST4_0A | 0242 | ST4_0B |
| 024B | ST4_1 | 024D | ST4_2 | 0250 | ST4_3 |
| 0253 | ST4_4 | 025D | ST5_0 | 0264 | ST5_1 |
| 0266 | ST5_2 | 0270 | ST6_0 | 027B | ST7_0 |
| 0280 | ST8_0 | 0287 | ST8_1 | 028E | ST8_2 |
| 0292 | ST8_3 | 0000 | START | 018C | STATE_0 |
| 01E2 | STATE_1 | 020E | STATE_2 | 021D | STATE_3 |
| 022B | STATE_4 | 0257 | STATE_5 | 026B | STATE_6 |
| 0274 | STATE_7 | 027D | STATE_8 | 0294 | STATE_A |
| 0299 | STA_0 | 0088 | TCON | 0334 | TD0 |
| 03A0 | TD1 | 0027 | TEMP | 0388 | TEST_DISPLAY |
| 008D | TH1 | 0089 | TMOD | 03D9 | TOP |
| 03E6 | TOP_0 | 03EA | TOP_1 | FFFF | TRUE |
| 00A7 | UP_OCT | | | | |

What is claimed is:

1. A device for use with a separate musical instrument, comprising:

a processor module having a standard Musical Instrument Device Interface (MIDI) input port, a processor having input lines coupled to said MIDI input port, and an output port having a plurality of output lines coupled to output pins of said processor;

at least a first display module having an input port with a plurality of input lines corresponding to said output lines of said processor module, a plurality of lights, each of said lights being spaced to correspond to the inputs of said musical instrument, decoding logic having inputs coupled to said input lines and output lines coupled to said lights for activating said lights in accordance with coded signals received from said processor module; and said processor being programmed to respond to certain MIDI signals received at said MIDI input port by generating output signals on said output lines including said coded signals indicating which of said lights is to be controlled and indicating whether said light is to be turned on or off.

2. The device of claim 1 wherein said musical instrument is a keyboard, and said inputs of said musical instrument are keys.

3. The device of claim 2 wherein said first display module includes an output port coupled to said input port and further comprising:

a second display module, identical to said first display module, having an input port removably connected to said output port of said first module such that a spacing between a last light of said first module and a first light of said second module equals a spacing between two keys on said separate keyboard.

4. The device of claim 3 wherein each of said first and second display modules includes a plurality of select lines coupled between said input and said output ports, the position of said select lines being shifted between said input and output ports.

5. The device of claim 3 wherein each of said first and second display modules includes a plurality of return lines coupled between said input and output ports, one of said return lines being coupled to a voltage to indicate to said processor the presence of said board, the position of said return lines being shifted between said input and output ports.

6. The device of claim 3 wherein said processor is programmed to place middle C at the leftmost light when a single display module is connected, and otherwise to place middle C near the middle of the display modules.

7. The device of claim 6 wherein said placement of middle C is accomplished with a plurality of shift values stored in a memory on said processor module, said processor being programmed to select one of said shift values in accordance with the number of connected display modules, said shift value being applied to each note number received on said MIDI input port.

8. The device of claim 7 further comprising a plurality of switches on said processor module for providing an additional shift input for middle C to said processor.

9. The device of claim 2 further comprising means, coupled to saidprocessor, for indicating which one of sixteen MIDI channels said processor will respond to.

10. The device of claim 9 wherein said processor is programmed to provide, in response to a MIDI status word with binary 1001 followed by a four bit number corresponding to said one MIDI channel, a light on signal on one of said output lines and a coded signal to select one; of said lights corresponding to a note number data byte following said status word, shifted by a shift amount stored in said processor to place middle C at a desired one of said lights.

11. The device of claim 10 wherein said processor is programmed to provide, in response to a MIDI status word with binary 1000 followed by a four bit number corresponding to said one MIDI channel, a light off signal on one of said output lines and a coded signal to select one of said lights corresponding to a note number data byte following said status word, shifted by a shift amount stored in said processor to place middle C at a desired one of said lights.

12. The device of claim 11 wherein said processor is programmed to provide said coded signals in response to additional note number data bytes without additional status bytes, with an on signal being provided unless a velocity data byte following said note number data byte is zero, with an off signal being provided in response to such zero velocity data byte.

13. The device of claim 2 wherein said processor module further comprises a MIDI thru port for presenting all MIDI signals received at said MIDI input port.

14. A music teaching device for use with a separate keyboard, comprising:
a processor module having a standard Musical Instrument Device Interface (MIDI) input port, a processor having input lines coupled to said MIDI input port, and an output port having a plurality of output lines coupled to output pins of said processor;
at least a first display module having an input port with a plurality of input lines corresponding to said output lines of said processor module, a plurality of lights, each of said lights being spaced to correspond to the keys of a keyboard, decoding logic having inputs coupled to said input lines and output lines coupled to said lights for activating said lights in accordance with coded signals received from said processor module;
said processor being programmed to ignore certain MIDI signals received at said input port and, in response to note on and note off signals received at said MIDI input port, generating output signals on said output lines including said coded signals indicating which of said lights is to be controlled and indicating whether said light is to be turned on or off;
means, coupled to said processor, for indicating which one of sixteen MIDI channels said processor will respond to;
said processor being programmed to provide, in response to a MIDI status word with 1001 followed by a four bit number corresponding to said one MIDI channel, a light on signal on one of said output lines and a coded signal to select one of said lights corresponding to a note number data byte following said status word, shifted by a shift amount stored in said processor to place middle C at a desired one of said lights;
said processor being programmed to provide, in response to a MIDI status word with binary 1000 followed by a four bit number corresponding to said one MIDI channel, a light off signal on one of said output lines and a coded signal to select one of said lights corresponding to a note number data byte following said status word, shifted by a shift amount stored in said processor to place middle C at a desired one of said lights; and
said processor being programmed to provide said coded signals in response to additional note number data bytes without additional status bytes, with an on signal being provided unless a velocity data byte following said note number data byte is zero, with an off signal being provided in response to such zero velocity data byte.

15. A music teaching device for use with a separate keyboard, comprising:
a processor module having a standard Musical Instrument Device Interface (MIDI) input port, a processor having input lines coupled to said MIDI input port, and an output port having a plurality of output lines coupled to output pins of said processor;
a first display module having an input port with a plurality of input lines corresponding to said output lines of said processor module, a plurality of lights, each of said lights being spaced to correspond to the keys of a keyboard, decoding logic having inputs coupled to said input lines and output lines coupled to said lights for activating said lights in accordance with coded signals received from said processor module, and an output port coupled to said input port;
said processor being programmed to ignore certain MIDI signals received at said input port and, in response to note on and note off signals received at said MIDI input port, generating output signals on said output lines including said coded signals indicating which of said lights is to be controlled and indicating whether said light is to be turned on or off;
at least a second display module, identical to said first display module, having an input port removably connected to said output port of said first module such that a spacing between a last light of said first module and a first light of said second module equals a spacing between two keys on said separate keyboard;

each of said first and second display modules including a plurality of select lines coupled between said input and said output ports, the position of said select lines being shifted between said input and output ports;

each of said first and second display modules including a plurality of return lines coupled between said input and output ports, one of said return lines being coupled to a voltage to indicate to said processor the presence of said board, the position of said return lines being shifted between said input and output ports;

said processor being programmed to place middle C at the leftmost light when a single display module is connected, and otherwise to place middle C near the middle of the display modules.

16. The device of claim 15 wherein said placement of middle C is accomplished with a plurality of shift values stored in a memory on said processor module, said processor being programmed to select one of said shift values in accordance with the number of connected display modules, said shift value being applied to each note number received on said MIDI input port.

17. The device of claim 16 further comprising a plurality of switches on said processor module for providing an additional shift input for middle C to said processor.

* * * * *